United States Patent [19]
Dean

[11] 3,730,288
[45] May 1, 1973

[54] DUAL STEERING SYSTEM
[75] Inventor: Harold F. Dean, Woking, England
[73] Assignee: Clark Equipment Company
[22] Filed: Dec. 9, 1970
[21] Appl. No.: 96,557

[52] U.S. Cl..................180/79.2 R, 60/52 S, 91/413
[51] Int. Cl. ...............................................B62d 5/06
[58] Field of Search....................180/79.2 R, 79.2 B, 180/79.2 C; 60/52 S; 91/413

[56] References Cited

UNITED STATES PATENTS

| 3,249,173 | 5/1966 | Gordon | 180/79.2 |
| 3,333,413 | 8/1967 | Mercier et al. | 60/52 S |
| 3,482,398 | 12/1969 | Christensen | 60/52 S |
| 1,955,922 | 4/1934 | Lamond | 60/52 S |

FOREIGN PATENTS OR APPLICATIONS

| 728,968 | 3/1961 | Canada | 60/52 S |
| 1,201,675 | 7/1959 | France | 180/79.2 R |
| 570,428 | 6/1956 | Italy | 60/52 S |

Primary Examiner—Leo Friaglia
Assistant Examiner—John A. Pekar
Attorney—Kenneth C. Witt, John C. Wiessler, Robert H. Johnson and Lewis J. Llamm

[57] ABSTRACT

A dual fluid steering system utilizing two pumps to supply fluid to actuators which turn the wheels for steering. The control valves and other portions of the system are arranged so that each of the pumps supplies fluid to both of the actuators during normal operation whereby if one of the pumps fails, the other pump can continue to be utilized to operate both actuators and turn both of the wheels with reduced force under emergency conditions resulting from the failure of one pump.

5 Claims, 1 Drawing Figure

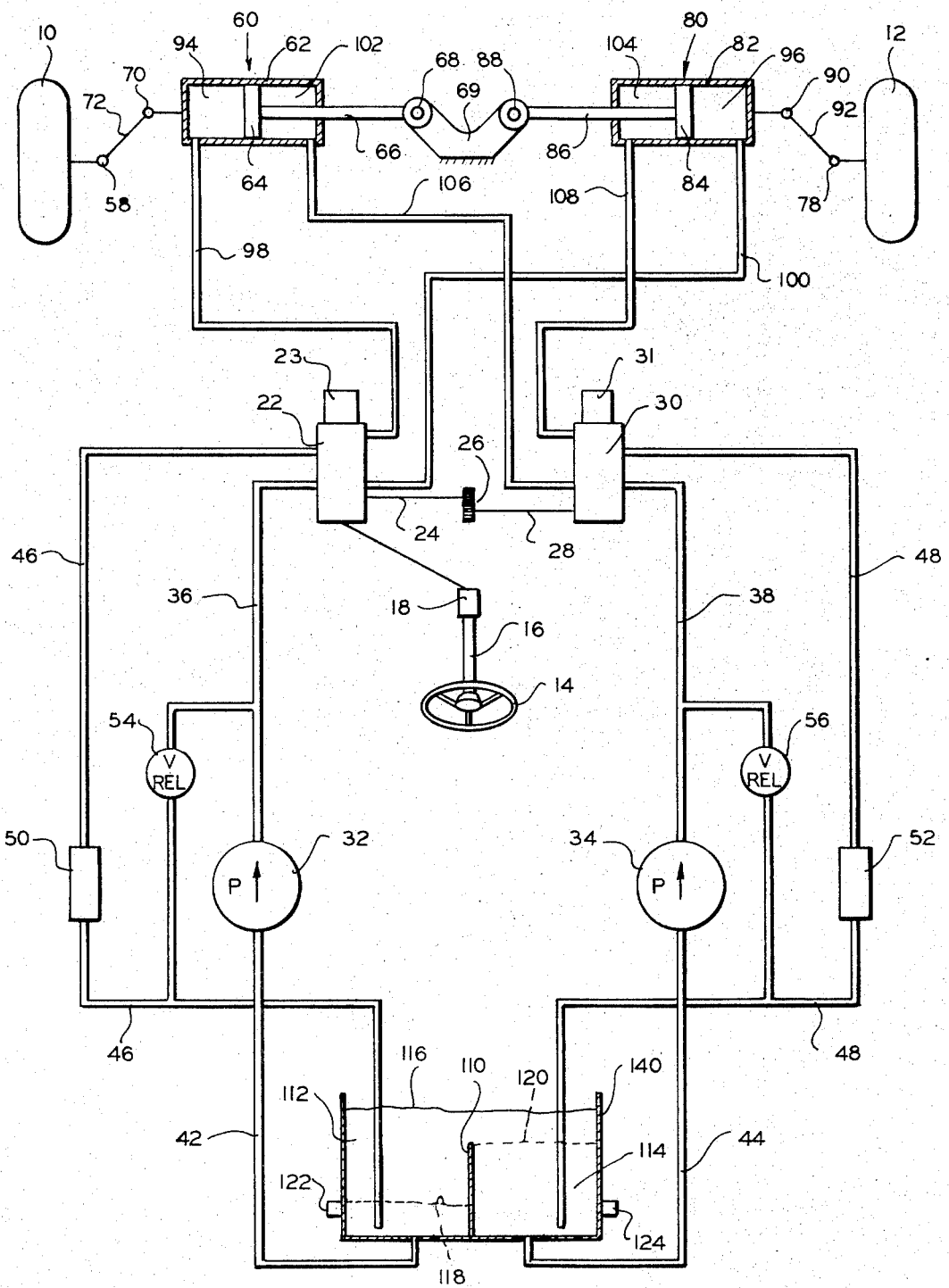

DUAL STEERING SYSTEM

BACKGROUND OF THE INVENTION

1. Field of the Invention

The present invention relates generally to fluid operated power steering systems for vehicles and is particularly adaptable for use with large heavy vehicles, but is not limited to use with such vehicles.

2. Description of the Prior Art

U.S. Pat. No. Re 25,126 shows a fluid type power steering system utilizing a single integral control valve and associated servo motor at the bottom of the steering column. The steering system of the said patent eliminates mechanical connections supplementing the fluid power actuator which turns the wheels of the vehicle for steering, but at the same time provides a steering system in which the position of the dirigible wheels is directly responsive to the position of the operator's steering wheel.

SUMMARY OF THE INVENTION

The present invention offers the advantages of the system disclosed in the mentioned U.S. patent and in addition affords the advantage that if a portion of the fluid system should fail, it would be possible to continue steering operation with the steering force reduced to approximately half or less of the normal steering force, but not reduced to the extent of the emergency arrangement disclosed in the patent. It is for this reason that the present invention is particularly adaptable for large vehicles; that is, the emergency steering arrangement of the patented structure might not be adequate for a large vehicle.

BRIEF DESCRIPTION OF THE DRAWING

The single FIGURE of the drawing is a schematic diagram of a fluid steering system embodying the present invention.

DESCRIPTION OF THE PREFERRED EMBODIMENT

Referring to the drawing, the numerals 10 and 12 indicate dirigible wheels which must be turned in unison in order to steer a vehicle. The numeral 14 indicates an operator's steering wheel which is turned by the operator in the usual manner either clockwise to steer the vehicle to the right or counterclockwise to steer the vehicle to the left. The operator's steering wheel 14 is mounted on the steering column 16 which, at the bottom, has a gear mechanism 18 which is connected by the connection 20 to a device 22, 23 which is a combination control valve 22 and servo motor 23 as shown in the aforementioned U.S. Pat. No. Re 25,126.

The valve 22 in turn is connected by means of a shaft 24 and a reduction gear set 26 and another shaft 28 to a device 30, 31 which is the same as device 22, 23 except that it operates at a slower speed because of reduction gear set 26 and consequently discharges a smaller amount of fluid than device 22, 23 for a given amount of rotation of operator's steering wheel 14.

The system is supplied with fluid by two pumps 32 and 34 which are driven in a suitable manner such as by the engine of the vehicle. Pump 32 is connected by a conduit 36 to valve 22 while pump 34 is connected by conduit 38 to valve 30. The suction sides of pumps 32 and 34 are connected to a reservoir 40 by means of conduits 42 and 44, respectively.

Discharge from valves 22 and 30 flows respectively through conduits 46 and 48, which may have filters 50 and 52 therein if desired, back to the reservoir. Relief valves 54 and 56 to limit the maximum pressure of pumps 32 and 34 respectively, are connected in the usual manner between conduits 36 and 46 and 38 and 48, respectively.

Left wheel 10 is pivoted about vertical axis 58 by means of a piston and cylinder type actuator 60 which includes a cylinder 62 and a piston 64 having a rod 66 secured to the piston. The piston rod is pivotally connected at 68 to a suitable support 69 on the vehicle and the cylinder 62 is pivotally connected at 70 to a link 72 which turns (pivots) the wheel 10 as the expansible chamber device 60 is expanded and contracted in a manner to be described. On the right side of the vehicle, the wheel 12 is pivoted about axis 78 and to operate this wheel a piston cylinder type expansible chamber device 80 (mounted in allochiral relation to actuator 60) is provided comprising a cylinder 82, a piston 84 and a piston rod 86. The piston rod 86 is pivotally connected at 88 to the support 69 on the vehicle and the cylinder is pivotally connected at 90 to a link 92 which turns the wheel 12 when actuator 80 is expanded or contracted.

The device 22, 23 supplies fluid to or discharges it from the head ends of the respective actuators, that is, from the chambers indicated by the numerals 94 and 96, respectively. Conduit 98 connects valve 22 with chamber 94, while conduit 100 connects valve 22 with chamber 96.

The other valve 30 is similarly connected to the chambers 102 and 104 respectively at the rod ends of the two actuators to supply fluid to or discharge it from such chambers. Conduit 106 connects chamber 102 with valve 30, while conduit 108 connects chamber 104 with valve 30.

When it is desired to steer the vehicle to the left, operator's steering wheel 14 is turned counterclockwise which causes device 22, 23 to supply fluid under pressure from conduit 36 through conduit 98 to chamber 94 and extend actuator 60 which pivots wheel 10 counterclockwise as seen on the drawing. At the same time, fluid is discharged from chamber 96 through conduit 100 and valve 22 back through conduit 46 to the reservoir 40.

Simultaneously, device 30 is operated at a slower speed than device 22, 23 by virtue of the reduction gear 26. This supplies fluid under pressure from conduit 38 through conduit 108 to chamber 104 to cause actuator 80 to contract and pivot wheel 12 in the direction of a left turn. Valve 30 releases fluid from chamber 102 through conduit 106 and discharges it through conduit 48 back to reservoir 40.

When a right turn is desired, steering wheel 14 is turned clockwise; device 22, 23 then supplies fluid under pressure through conduit 100 to chamber 96 and discharges it from chamber 94. Similarly, device 30, 31 supplies fluid under pressure through conduit 106 to chamber 102 and at the same time discharges it from chamber 104 through conduit 108.

It will be appreciated that because of piston rods 66 and 86, respectively, chamber 102 and 104 would fill or empty at a greater rate, as the case may be, than the head end chambers 94 and 96, but for the fact that device 30, 31 is geared to operate at a slower speed than device 22, 23. The gear ratio of reduction gear set 26 is selected so that the amount of fluid supplied to or discharged from the chambers 102 and 104 is proportionally less than that discharged from or supplied to chambers 94 and 96 whereby the wheels 10 and 12 will move the desired amount to achieve a turn. It will be appreciated that the wheel on the inside of the turn is pivoted slightly more than the wheel on the outside since it is operating about a smaller radius, but this differential is preferably achieved by the geometry of the respective linkages.

It will be appreciated also that it is possible to omit the gear reduction set 26 and instead use a smaller capacity device 30, 31 to achieve the desired smaller flow, although as a practical matter, it is generally better to use identical devices with the reduction gear in between. Also, it will be readily appreciated that portion 18 of the steering column and devices 22, 23 and 30, 31 can all be combined structurally as a single unit, if desired, instead of separated as shown schematically on the drawing.

The dual steering system disclosed herein provides for emergency operation at partial force in the event of a failure in one of the pumps 32 or 34 or other parts associated with just one of the pumps such as, for example, conduit 36 and conduit 46 associated with pump 32 and filter 50 and relief valve 54 also associated with pump 32. For example, if pump 32 should fail and cease delivering fluid, the steering system would still be operative. Under such circumstances, pump 34 will continue to operate and device 30, 31 will supply fluid to either chamber 102 or chamber 104 at the rod ends of the cylinders, depending upon the direction steering wheel 14 is turned. At the same time, as explained in U.S. Pat. No. Re 25,126, servo motor 23 will act as a pump and will continue to supply fluid to or discharge it from chamber 94 or chamber 96 as the case may be. As explained in the said patent, the servo motor normally acts to operate a follow up member forming a portion of valve 22 which automatically closes the valve 22 when the dirigible wheels of the vehicle are in a position corresponding to the position of steering wheel 14, thus making unnecessary any mechanical follow up connection between the dirigible wheels and the steering valve. However, upon failure of the pump, such as 32, supplying a steering valve, the servo motor 23 then acts as a pump, enabling continued operation of the portion of the steering associated with device 22, 23, but at reduced force.

If pump 34 should fail, then device 22, 23, would continue to operate in the normal manner, while device 30, 31 would operate under the emergency conditions described in the preceding paragraph for device 22, 23.

In the event of a pump failure as mentioned in the two preceding examples, it will be appreciated that it might be possible to operate the steering system for an indefinite period utilizing only partial force. In the event of a conduit leak, for example, such as a leak in conduit 36, the system could lose fluid which could ultimately cause the steering system to cease functioning entirely. The reservoir 40 is so arranged to warn the operator of such an impending occurrence because, since he still has partial steering power, at least, he might not be aware that anything was amiss.

To warn the operator before all fluid has been discharged out of the steering system or so much of it that the system will no longer operate, the reservoir 40 is arranged as shown in the drawing with a center baffle 110 which extends the entire distance between the ends of the reservoir and thus divides it into two chambers indicated by the numeral 112 on the left side and 114 on the other side. Conduit 46 discharges into chamber 112 and conduit 48 discharges into chamber 114. The normal level of fluid in the reservoir is indicated at 116. Assuming that a leak occurs in conduit 36, fluid will begin to escape from the system and since the leak is on the left side, the fluid discharged through conduit 46 back into chamber 112 on the left side of the reservoir will be less than normal and ultimately the level of fluid in left chamber 112 will reach the dashed line indicated by 118, but because of the baffle 110, the level of the fluid on the other side of the reservoir will be at the level indicated by dashed line 120.

This will mean that pump 34 and the elements supplied thereby will continue to be fully operable, but to warn the operator that part of the fluid is gone from the steering system, an alarm device as indicated schematically at 122 on the left side of the reservoir, with a corresponding device being indicated at 124 on the right side of the reservoir, will signal and alarm to the operator by means of a buzzer, light or other suitable means to indicate to him that there is an emergency and he should stop the vehicle and arrange for repairs.

It will be appreciated that the dual steering system disclosed herein provides for turning of the dirigible wheels responsively to the turning of the operator's steering wheel and that if a failure occurs in a certain part of the system, the system will remain operative at least for a period of time sufficient to enable the operator to bring the vehicle to a halt. Furthermore, means are provided to prolong the period of emergency operation, by the arrangement of the reservoir, and a signal is provided to the operator that a failure, leak or other emergency has occurred.

While I have described and illustrated herein a preferred mode of carrying out my invention in accordance with the statutes, it will be understood by those skilled in the art that modifications may be made. I intend to cover by the appended claims all such modifications which fall within the true spirit and scope of my invention.

It will be understood that where reference is made in the claims to failure of a pump that such is illustrative only, and that the claimed dual steering system will protect also against the failure of other components of the dual steering system in the manner explained hereinbefore.

I claim:

1. A dual steering system comprising two extensible and contractible fluid actuators connected respectively to turn pivotally two wheels of a vehicle, each of the said actuators having two unconnected variable volume chambers, two pumps for supplying fluid to the said actuators, and two valves connected respectively to control the output of the said two pumps, one of said valves being connected jointly to one of the said chambers of each of the actuators, the other valve being connected jointly to the other of the said chambers of each of the actuators whereby each pump normally supplies fluid to both actuators but without intermixing the fluid outputs of the two pumps and whereby upon failure of one pump the steering system still can be operated to turn both wheels with reduced force.

2. A dual steering system as specified in claim 1 in which a first servo motor is connected in circuit with one of the said valves and the actuators supplied thereby and a second servo motor is connected in circuit with the other valve and the actuators supplied thereby, each of the said servo motors serving to close its respective valve when steering action ceases.

3. A dual steering system as specified in claim 2 which includes an operator's steering wheel, and in which the said two valves and two servo motors are connected to be operated simultaneously by the turning of the said operator's steering wheel.

4. A dual steering system as specified in claim 3 in which a reduction gear is interposed in the system so that one of the said valves and servo motors operates at a slower speed than the other valve and servo motor.

5. A dual steering system as specified in claim 1 in which the said fluid actuators are piston and cylinder type devices mounted in allochiral relation, one of the said valves is connected to the rod ends of both cylinders, and the other valve is connected to the head ends of both cylinders.

* * * * *